United States Patent [19]
Iwahara et al.

[11] Patent Number: 5,140,443
[45] Date of Patent: Aug. 18, 1992

[54] IMAGE SCANNING APPARATUS

[75] Inventors: Makoto Iwahara; Tadayoshi Miyoshi, both of Yokohama; Shigeaki Tada, Hiratsuka; Takashi Kuriyama, Yokohama; Itsuo Takanashi, Kamakura; Ichiro Shishido, Yokohama; Kaoru Kitami, Iwai, all of Japan

[73] Assignee: Victor Company of Japan, Ltd., Yokohama, Japan

[21] Appl. No.: 557,612

[22] Filed: Jul. 24, 1990

[30] Foreign Application Priority Data

| Jul. 25, 1989 | [JP] | Japan | 1-192059 |
| Jul. 27, 1989 | [JP] | Japan | 1-194561 |
| Sep. 26, 1989 | [JP] | Japan | 1-249512 |
| Oct. 27, 1989 | [JP] | Japan | 1-281531 |
| Oct. 27, 1989 | [JP] | Japan | 1-281532 |
| Feb. 20, 1990 | [JP] | Japan | 2-15843 |

[51] Int. Cl.⁵ .................................. H04N 1/04
[52] U.S. Cl. ................................ 358/474; 358/491; 358/494; 355/233
[58] Field of Search ............... 358/401, 408, 474, 475, 358/476, 480, 487, 488, 494, 496, 498, 400, 448, 490, 491, 497; 355/232, 233, 234, 235, 236, 237, 238, 239, 240, 241

[56] References Cited

U.S. PATENT DOCUMENTS

| 4,571,636 | 2/1986 | Itoh | 358/496 |
| 4,891,711 | 1/1990 | Tomita | 358/494 |
| 4,893,196 | 1/1990 | Koshiyouji | 358/497 |

Primary Examiner—Jin F. Ng
Assistant Examiner—Edward Lefkowitz
Attorney, Agent, or Firm—Michael N. Meller

[57] ABSTRACT

An apparatus for scanning an image, comprising a main unit body casing, a first original platen having a transparent surface on which a light-reflective original is placed, a second original platen movable in a horizontal direction inside the main unit body casing upon which platen a light-transmissive original is placed, a light source that irradiates light to the first and second original platens, an image sensor, and an optical apparatus disposed inside the body casing, and which respectively passes reflected light from the original placed on the first original platen and light transmitted through the original placed on the second original platen to the image sensor.

14 Claims, 10 Drawing Sheets

IMAGE SCANNING APPARATUS

BACKGROUND OF THE INVENTION

The present invention relates to an apparatus for reading images such as photographs, pictures and symbols, and more particularly, to an image scanning apparatus that can use light penetrating an original or reflected light from an original to read originals of differing size and that are the object of read.

In general, the originals that are scanned by image scanning apparatus are large in size, such as drawings that are printed on paper, and there are various sizes down to small sizes such as 16-millimeter film. When image information printed on paper such as memorandum and document paper or the like is scanned, the image that is to be scanned is irradiated with light and the light that is reflected from the image is collected and read performed. In addition, when an image that is written on a material such as photographic film which is light-transmissive, the light is made to pass through the original which is to be read, and the transmitted light is collected to perform read.

In this manner, image reading apparatus that perform read of an image by using the reflected light that is reflected by, or the light that is transmitted through the original are known as having a reflecting mirror that sends the light that is irradiated from a light source and transmitted through the original or the light that is reflected from the original, an image forming lens and an image sensor to which the light that passes the image forming lens is irradiated.

In general, there are many cases where large-sized originals have their images read by using reflected light and there are many cases where originals for which the penetrating light is used to read the image are small in size. Because of this, an original platen on which an original having its image read by using reflected light is placed, is generally provided on an upper surface of the body casing of the main unit of the image scanning apparatus. In addition, an original platen on which an original having its image to be read by using transmitted light is usually internally incorporated into the body casing of the main unit. In an image scanning apparatus having such a structure, there must be a light source in order to generate reflected light or a light source to generate the penetrating light. In addition, the optical system to irradiate the reflected light onto the image sensor and an optical system to irradiate the penetrating light onto the image sensor must also be provided. Because of this, the structure of the apparatus not only becomes complex but the size of the entire apparatus also becomes large. Moreover, it is also necessary to have a powerful light source when the penetrating light is to be used to read an image, and this necessitates a large light source and also causes the problem of dissipating the heat generated. Furthermore, when an image is to be read by changing the magnification ratio, it is necessary to move the reflecting mirror that is disposed in the optical system. When this is done, it is necessary to consider the interference of the two optical systems when the reflecting mirror is moved.

Accordingly, in an apparatus that reads images using the light that is either transmitted through an original or reflected by it, and object of the present invention is to provide an image scanning apparatus which has a simplified structure and is compact overall.

In addition, another object of the present invention is to provide an image scanning apparatus that has a compact light source and a small amount of generated heat.

Still another object of the present invention is to provide an image scanning apparatus that has no interference between the two optical systems.

SUMMARY OF THE INVENTION

The image scanning apparatus of the present invention is comprised of a main unit body casing that is provided on its top surface with a slit through which light passes, a first original platen disposed so as to movable in a horizontal direction perpendicular to the slit ot the top of the main unit body casing and having a transparent surface on which an original is placed, a second original platen disposed so as to movable in the horizontal direction inside the main unit body casing upon which platen an original is placed, a first light source disposed inside the main unit body casing and irradiating light onto an original on a first platen via the slit, a second light source that irradiates light in the downward direction onto an original on a second platen, an image sensor disposed inside the main unit body casing, so that light transmitted through the original mounted on the second original platen and light reflected by original mounted on the first original platen are irradiated to the image sensor disposed inside the main unit body casing.

In addition, the apparatus of the present invention has light converging means that collects the light from the light source and irradiates it in the direction of the original platen.

DETAILED DESCRIPTION OF THE PREFERRED EMBODIMENTS

Figure 1:
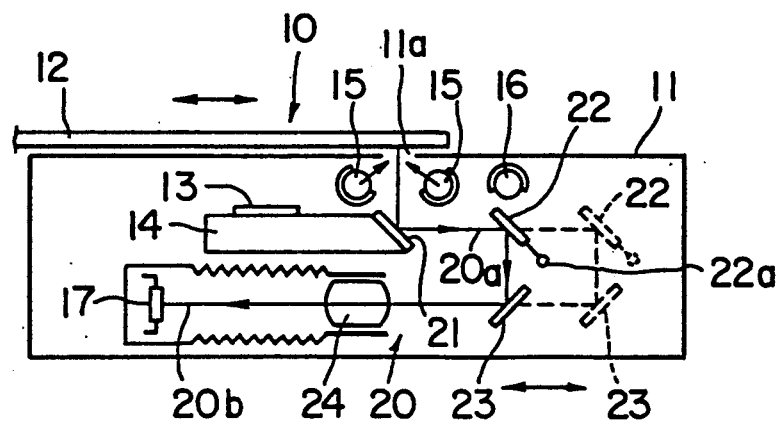
FIG. 1 through FIG. 3 are diagrams indicating a first embodiment of the apparatus according to the present invention, with FIG. 1 and FIG. 2 being outline longitudinal sectional drawings, and FIG. 3 being a perspective view indicating one example of the drive mechanism of an optical system, and the second original platen, and FIGS. 4A, 4B and 4B being partial enlargements indicating the mechanism shown in FIG. 3.
Figure 2:
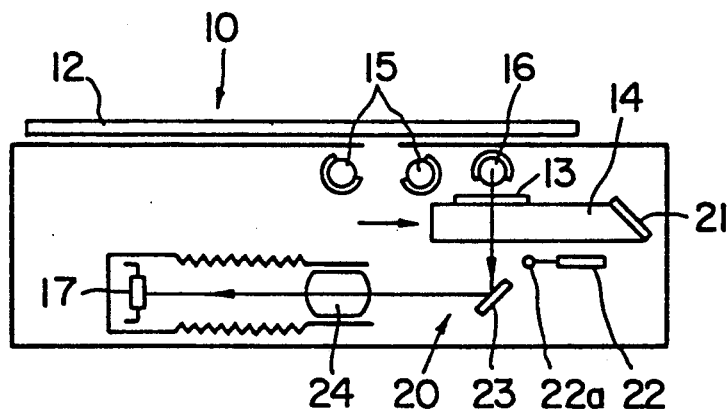
Figure 3:
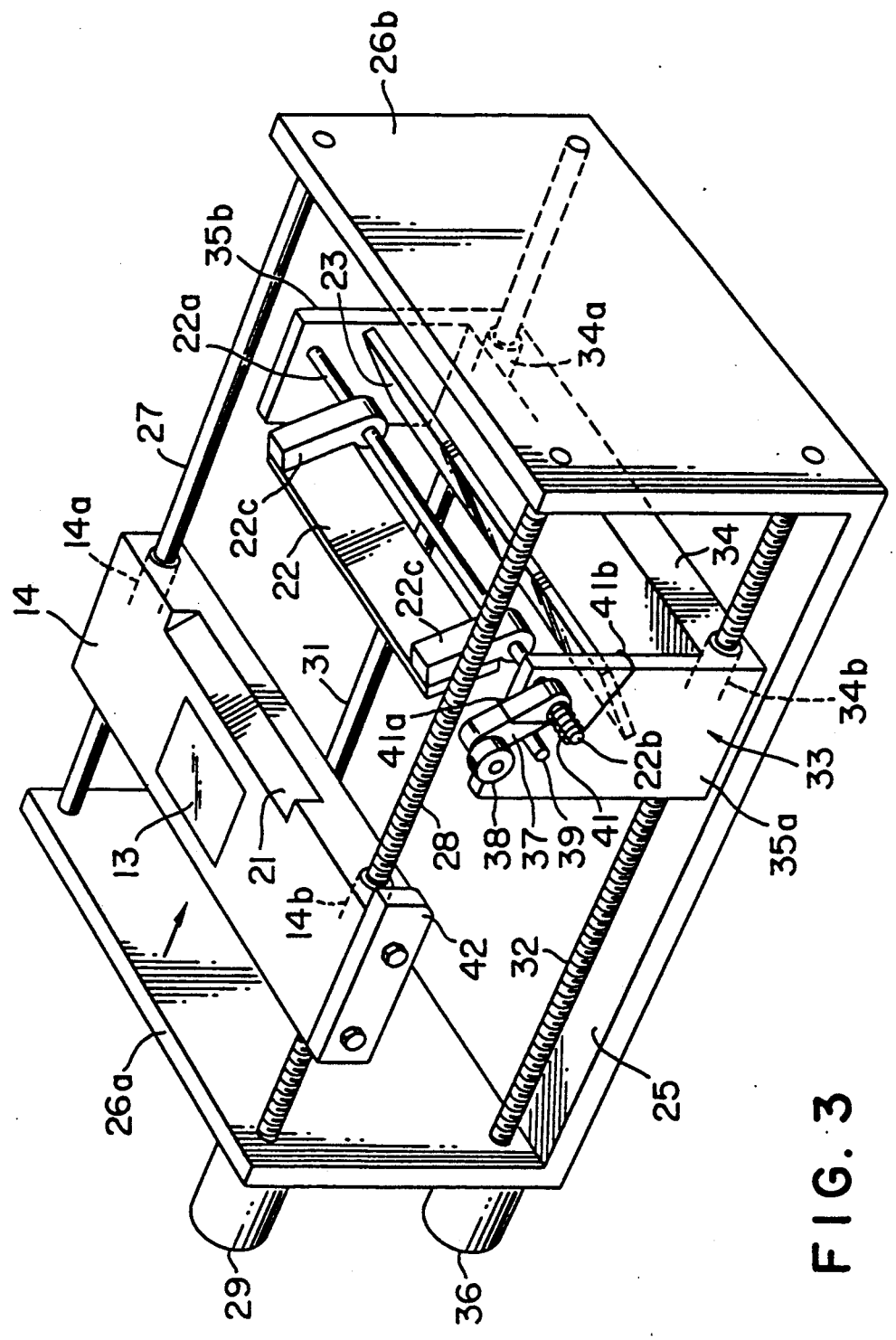

FIG. 1 through FIG. 3 indicate a first embodiment of the present invention. An image scanning apparatus 10 has a box-shaped body casing for the main unit. The top surface of this body casing 11 is formed with a slit 11a through which light passes. To the top surface of this body casing 11 is mounted a first original platen 12 that is transparent and moves horizontally so as to cross the slit 11a. On the first original platen 12 an original on which is drawn the image to read is placed.

Inside the body casing 11 is mounted a transparent, second original platen 14 upon which an original of a light-transmissive material and on which is drawn the image to read is placed. This second original platen 14 is movable horizontally in the same manner as the first original platen 12. Inside the body casing 11 at a position above the second original platen 14 is disposed a first light source 15 and a second light source 16. The first light source 15 irradiates light in the direction of the first original platen 12 and is fixed in disposition close to the slit 11a and in the direction of the slit 11a.

The second light source 16 irradiates light in the downward direction in the direction of the second original platen 14 and is fixed in disposition facing downwards.

To the side at one end towards the bottom of the body casing 11 is disposed an image sensor 17 that scans the image.

The light that is irradiated from the first light source 15 in the direction of the first original platen 12 is irradiated to the original mounted on the first original platen 12 and is reflected back. This reflected light passes through the optical path formed by the optical means 20 which is to be described below, and is irradiated to the image sensor 17. In addition, the light that is irradiated from the second light source 16 and in the direction of the second original platen 14 is transmitted through the light-penetrable original 13 placed on the second original platen 14, passes through the optical path formed in the same manner by the optical means 20 and is irradiated to the image sensor 17.

The optical means 20 is disposed inside the body casing 11 and has a first reflecting mirror 21 that reflects the reflected light from the original placed on the first original platen 12, into a first optical path 20a parallel to the surface of the first original platen 12 upon which the original is placed. In this embodiment, this first reflecting mirror 21 is mounted at one end of the second original platen 14.

The first optical path 20a extends from the first reflecting mirror 21 to a second reflecting mirror 22 that reflects the reflected light from the first reflecting mirror 21, in the direction perpendicular to the first optical path 20a. This second reflecting mirror 22 is linked to a swinging shaft 22a so that it can be swung around the pivot of the swinging shaft 22a, between a position on a first optical path 20a and a position removed from the first optical path 20a.

At a position opposing the second reflecting mirror 22 and on the side below the second reflecting mirror 22 is disposed a third reflecting mirror 23 that reflects the reflected light from the second reflecting mirror 22 into a second optical path 20b that extends in the direction opposite to and parallel to the first optical path 20a.

In the second optical path 20b between the third reflecting mirror 23 and the image sensor 17 is disposed a convergence lens 24 that converges the reflected light.

The optical means 20 is configured from the above described first reflecting mirror 21, second reflecting mirror 22, third reflecting mirror 23 and the convergence lens 24.

As has been described above, the second original platen 14 can move horizontally. In addition, the second reflecting mirror 22 and the third reflecting mirror 23 can move horizontally together in order to adjust the magnification ratio of the image that is to be scanned. FIG. 3 is a perspective view indicating an embodiment of a mechanism for this horizontal movement.

The pair of side plates 26a and 26b that are provided vertically and parallel to each other are mutually linked by a bottom plate at their lower ends. The pair of side plates 26a and 26b are linked at a position towards their tops, by a horizontal guide bar 27. Parallel to this guide bar is disposed at the same height a screw bar 28 so as to be freely rotatable, with both of its ends being supported by the pair of side plates 26a and 26b.

This horizontal guide bar 27 and screw bar 28 both pierce both of the end portions of the second original platen 14. This is to say that the horizontal guide bar 27 is slidably inserted into the through hole 14a, and the screw bar 28 is in engagement with the screw bar 14b formed in the other end of the second original platen 14.

One end of the screw bar 28 is linked to a motor 29 that is mounted to the side plate 26a and is rotatably driven by the motor 29.

To lower positions of the pair of side plates 26a and 26b there is a guide bar 31 which is linked parallel to and horizontally, with the horizontal guide bar 27. In addition, parallel to this guide bar 31 is disposed at the same height a screw bar 32 so as to be freely rotatable, with both of its ends being supported by the pair of side plates 26a and 26b.

To this guide bar 31 and screw bar 32 is mounted a reflecting mirror support member 33 which supports the second reflecting mirror 22 and third reflecting mirror 23. The reflecting mirror support member 33 has a pair of parallel side plates 35a and 35b which are fixed upright at both ends of the base plate 34. The guide bar 31 slidably pierces the through hole 34a formed at one end of the base plate 34. In addition, the screw bar 32 is in engagement with a screw hole 34b formed at the other end of the base plate 34.

One end of the screw bar 32 is rotatably movable by a motor 36 mounted to the side plate 26a.

The pair of side plates 35a and 35b of the reflecting mirror support member 33 support both ends of a swinging shaft 22a so that it is rotatably movable. To this swinging shaft 22a is fixed a pair of support members 22C in the direction perpendicular to the swinging shaft 22a. The second reflecting mirror 22 is mounted to this pair of support members 22c.

One end of the swinging shaft 22a pierces and protrudes through the side plate 35a. This protruding portion 22b has one end of a lever 37 mounted perpendicularly to it, and at the other end of this lever 37 is mounted a roller 38 which is rotatable. To the side plate 35a is fixed a stopper 39 in the same direction as the protruding portion 22b of the swinging shaft 22a. This stopper 39 is to stop the rotation of the lever 37 and the second reflecting mirror 22 is positioned on the first optical path 20a when the lever 37 is in contact with this stopper 39. The protruding portion 22b of the swinging shaft 22a is fitted with a coil spring 41 and one end 41a of this coil spring 41 is connected to the lever 37 and the other end 41b is connected to the side plate 35a. By fitting the coil spring in this manner, the lever 37 is normally urged to press the stopper 39.

To the front of the other end of the second original platen 14 is fixed a plate 42 which protrudes.

Both of the ends of the third reflecting mirror 23 are fixed to this pair of side plates 35a and 35b of the reflecting mirror support member 33.

The following is a description of the image scanning operation of the image scanning apparatus according to this embodiment.

The first part of the description will describe the operation for the irradiation of light to the original and the scanning of the image. In this case, then as indicated in FIG. 1, the the second original platen 14 is moved towards the rear (the left, as indicated in FIG. 1), and the first reflecting mirror 21 is fixed at a 35 position where it is directly beneath the slit 11a of the body casing 11. The motor 36 rotates and the rotation of the screw bar 32 causes the reflecting mirror support member 33 to move along the guide bar 31 and to move the second reflecting mirror 22 and third reflecting mirror 23 to a position of a predetermined image magnification ratio.

The original is placed on the first original platen 12 so that its image faces downwards. The light from the first light source 15 is irradiated to it and the first original platen 12 crosses the slit 11a and moves in the horizontal direction.

The light from the first light source 15 is irradiated to the original and reflected by it. This reflected light is reflected to the first reflecting mirror 21, second reflecting mirror 22 and third reflecting mirror 23, passes through the convergence lens 24 and is irradiated to the image sensor 17. The image sensor 17 scans the image by this reflected light.

The following is a description of the operation when an image drawn on material which is light-transmissive is scanned. In this case, the motor 29 is driven and the screw bar 28 rotates so that the second original platen 14 on which a light-transmissive original is placed is moved to a position between the second light source 16 and the third reflecting mirror 23, as shown in FIG. 2.

By this movement of the second original platen 14, the plate 42 fixed to the second original platen 14 is in contact with the roller 38 and the second reflecting mirror 22 is swung to a position removed from the first optical path 20a.

Figure 4A:
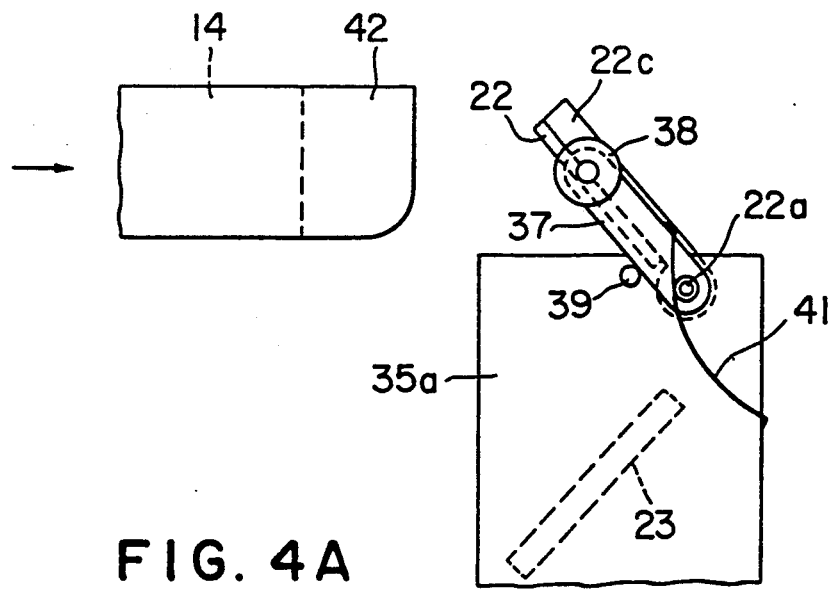
Figure 4B:
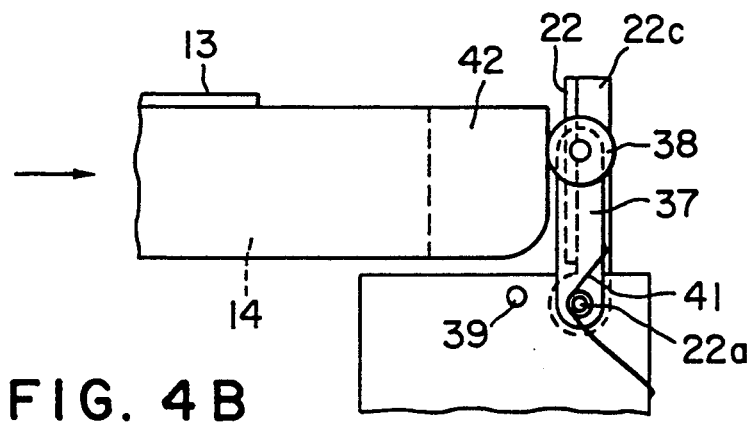
Figure 4C:
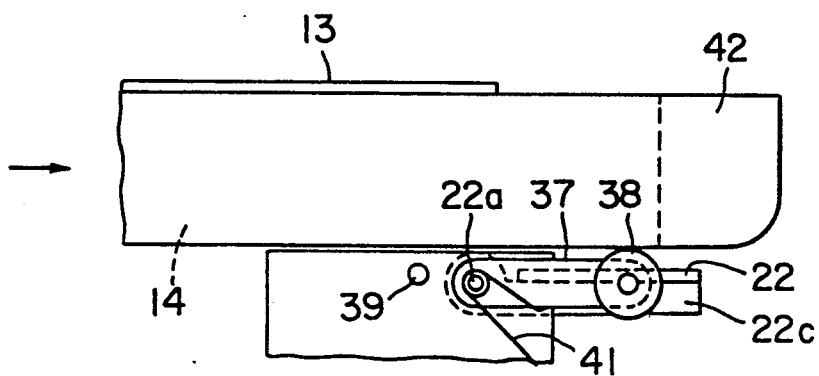
Figure 5:
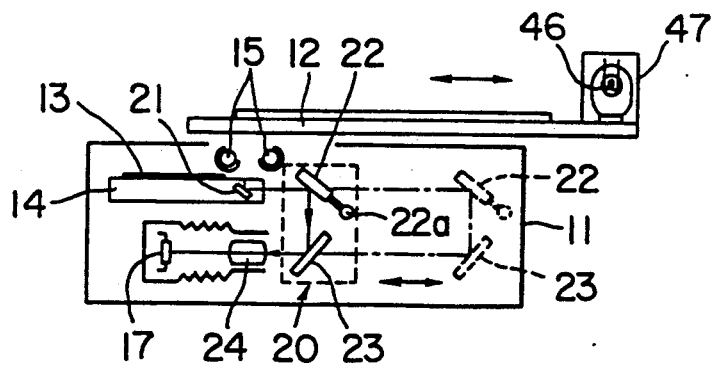
FIG. 5 through FIG. 8 are diagrams indicating a second embodiment of the apparatus according to the present invention, with FIG. 5 and FIG. 6 being outline longitudinal sections and FIG. 7 and FIG. 8 being perspective views for describing the light source mounted to the first original platen.

FIG. 4A through FIG. 4C are views for describing this swinging operation. This is to say that normally, when the coil spring 41 presses the lever 37 against the stopper 39 and the second reflecting mirror 22 is on the first optical path 20a (FIG. 4A). The second original platen 14 moves and the plate 42 is in contact with the roller 38, then the lever 37 resists the force of the coil spring 41, separates from the stopper 39 and starts to rotate (FIG. 4B). When the second original platen 14 moves further in the forward direction (towards the right) and reaches a predetermined stop position, the lever 37 rotates to a position in an approximately horizontal direction and the second reflecting mirror 22 is completely removed from the first optical path 20a (FIG. 4C).

To the light-transmissive original 13 is placed on the second original platen 14 which has moved forward to this position, light from the second light source 16 is irradiated. The light passes through the light-penetrable original 13 and the second original platen 14 and reaches the third reflecting mirror 23. After this third reflecting mirror 23, the reflected light passes through the convergence lens 24 in the same manner as has been described earlier, and is irradiated to the image sensor and the scanning of the image is performed.

In this manner, according to the present embodiment, it is possible to easily switch the optical systems necessary for image scanning using the reflected light from the first original platen 12 and image scanning using the light that is transmitted through the second original platen 14.

FIG. 5 through FIG. 8 are views indicating a second embodiment according to the present invention.

This second embodiment is characterized by the second optical system being disposed outside the body casing 11. The remainder of the configuration is the same as the apparatus indicated for the first embodiment and so corresponding portions are indicated with the same numerals, and the corresponding description of them is omitted.

In this second embodiment, a second optical system 46 is mounted to one end of the first original platen 12 disposed so as to be horizontally movable at a position on the top of the outside of the body casing 11.

Figure 7:
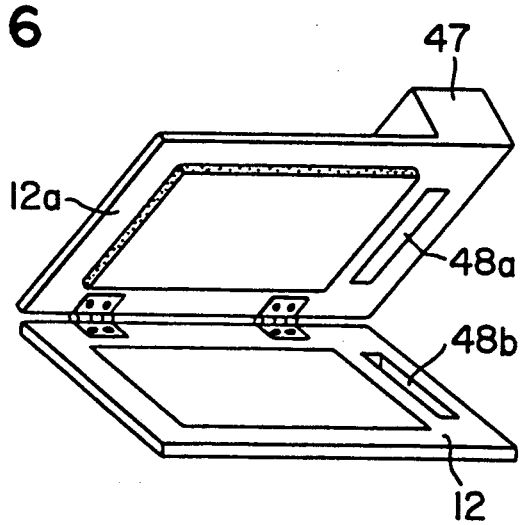
Figure 8:
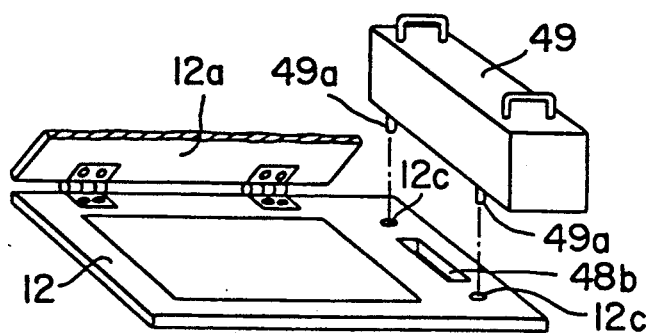
Figure 9:
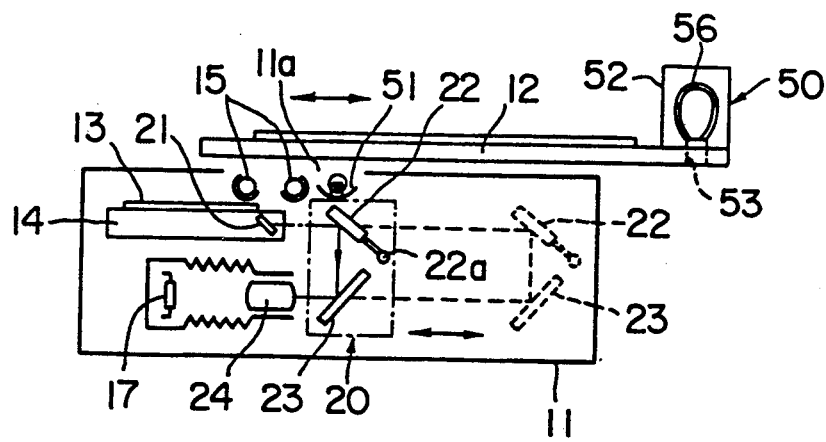
FIG. 9 through FIG. 12 are views indicating a third embodiment of the apparatus according to the present invention, with FIG. 9 and FIG. 10 being outline longitudinal sections, FIG. 11 being a sectional drawing along XI—XI of FIG. 10, FIG. 12 being a perspective view for describing the structure of the first original platen, and FIG. 13 through FIG. 16 being longitudinal sectional drawings indicating modifications of the light converging means.

FIG. 7 and FIG. 8 respectively indicate specific examples of the method of mounting. In the examples indicated in FIG. 7 and FIG. 8, the first original platen 12 is mounted with a cover 12a that rotates open and closed, and that covers the first original platen 12.

In the example indicated in FIG. 7, at one end of the cover 12a is fixed and a box-shaped casing 47 and a second optical system 46 is disposed inside this box-shaped casing 47. One end of the first original platen 12 and the cover 12a are formed with long hole openings 48a and 48b through which light from the second optical system 46 passes.

In the example indicated in FIG. 8, from above one end of the first original platen 12 is fixed a light source casing 49 and the second optical system 46 is disposed inside this light source casing 49. Attaching and removing the light source casing 49 is performed by inserting a pair of pins 49a protruding into the tottom surface of the light source casing 49, into the pair of holes 12c provided at one end of the first original platen 12.

Figure 6:
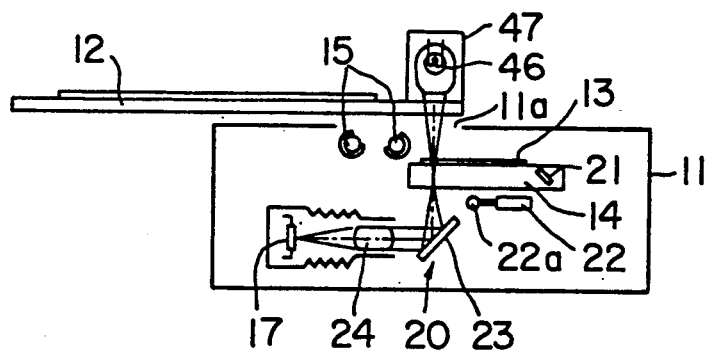

In this embodiment, when the image on a light-transmissive original 13 placed on the second original platen 14 is scanned, the light from the second optical system 46 is irradiated in the following manner. This is to say that as indicated in FIG. 6, the first original platen 12 is moved to the left, and the second optical system 46 is placed at a position directly above the third reflecting mirror 23. Then, while the light from the second optical system 46 is being irradiated, the second original platen 14 is moved horizontally as described earlier for the first embodiment. The light passes through the openings 48a and 48b and is irradiated to the light-penetrable original 13 and reading is performed for the image.

The second optical system 46 according to this embodiment and which requires a comparatively large amount of light can be placed on the outside of the body casing 11. By doing this, the space inside the body casing 11 can be made large even if the second optical system 46 is large, and the heat that is generated causes no adverse influence to the internal equipment.

FIG. 9 through FIG. 16 indicate a third embodiment of the present invention.

This embodiment is characterized by the light from the second light source being irradiated to outside of the main unit body casing, being collected by a convergence means and then irradiated again in the direction of the second original platen. The other portions of the configuration are the same as for the apparatus of the first and second embodiments and so corresponding portions are indicated with the same numerals, and the corresponding descriptions for them are omitted.

In this embodiment, second light sources 51 are disposed beneath a slit 11a in a body casing 11 and disposed in the direction of the slit 11a. In this embodiment, a pair of second light sources 51 are disposed one at each end of the side crossing the direction of movement of the second original platen 14.

Figure 12:
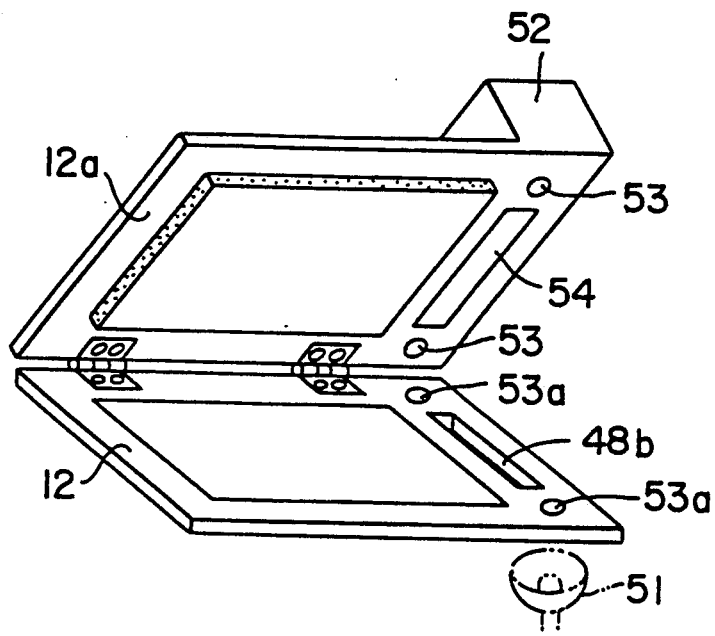

As indicated in FIG. 12, the first original platen 12 has an opening 48b and closing cover 12a mounted to it, and at one end of this opening and closing cover 12a is fixed a box-shaped casing 52 that configures the light convergence means.

Figure 11:
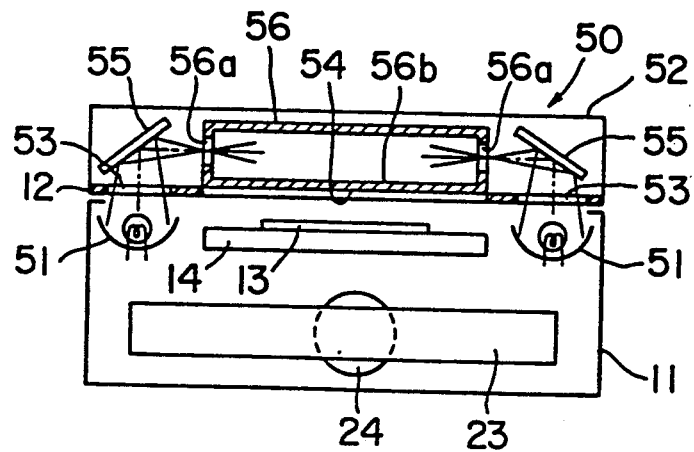

As indicated in FIG. 11, the box-shaped casing 52 is provided with light irradiation inlet openings 53 provided opposite the second light source 51, and a light irradiation outlet opening 54 through which light is irradiated in the direction of the second original platen 14. Then, inside the box-shaped casing 52 is also disposed a pair of reflecting mirrors 55 that reflect light irradiated in from the light irradiation inlet opening 53, to a position above the light irradiation outlet opening 54.

In addition, in the embodiment indicated in FI6. 11, a diffusion box 56 that diffuses the light, is disposed between the reflecting mirrors 55 and the light irradiation outlet opening 54. This diffusion box 56 has its inner surface painted with frosting so that light is easily diffused. On side surfaces opposite the reflecting mirrors 55 are provided with light path holes 56a and the bottom surface opposite the light irradiation outlet opening 54 is made of frosted glass 56b.

As indicated in FIG. 12, the first original platen 12 is provided with a light transmissive holes 53a at positions opposing the light irradiation inlet openings 53. In addition, at a position opposing the light irradiation outlet opening 54 is provided a long hole opening 48b.

Figure 10:
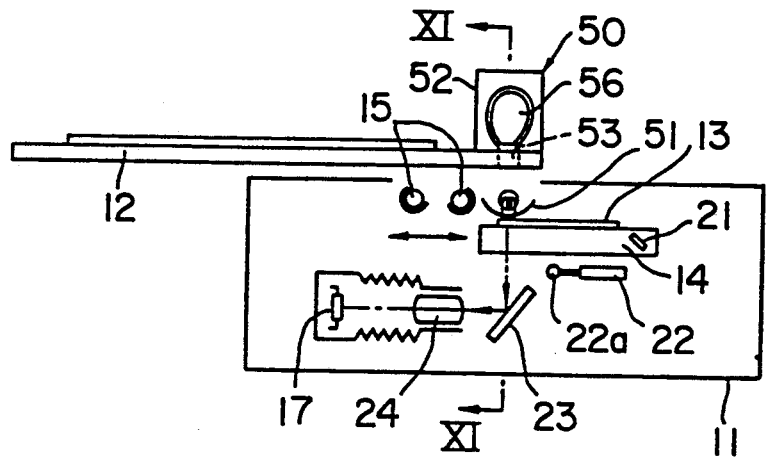

This embodiment operates as described below when light is irradiated to a light-transmissive original 13 on the second original platen 14. First, as indicated in FIG. 10, the first original platen 12 is moved to the left, and the convergence means 50 comes to a position directly above the third reflecting mirror 23. In this status, when light is irradiated from the second light sources 51, that light passes through the light irradiation inlet openings 53, is irradiated to inside the box-shaped casing 52, is then reflected by the reflecting mirror 55 and then enters the diffusion box 56. The light that is diffused inside the diffusion box 56 passes through the light irradiation outlet opening 54 and the long hole opening 48b and is then irradiated back into the body casing 11. Light is then irradiated to the second original platen 14 that passes in the horizontal direction underneath the light irradiation outlet opening 54.

The present embodiment differs from the previously described second embodiment in that the second light sources 51 are disposed inside the body casing 11. However, the convergence means 50 is used to converge the light from the second light sources 51 and to illuminate the second original platen 14 so that the second light sources 51 can be disposed at positions remote from a position immediately above the second original platen 14. Because of this, there is no increase in the size of the body casing 11 even if relatively large halogen lamps are used as the second light sources 51. In addition, it is also easy to prevent any adverse influences due to the generated heat by locating the second light sources 51 at positions at both ends of the body casing 11.

According to this embodiment, the second light sources are fixed and so when compared to the apparatus of the second embodiment, a moving cord for the second light source is not necessary. In addition, there is no movement and hence no vibration to cause an adverse influence to the light source.

FIG. 13 through FIG. 16 indicate another embodiment of the light convergence means. The light convergence means 50a indicated in FIG. 13 has a structure which is similar to the light convergence means 50 indicated in FIG. 11. In this light convergence means 50, the boxshaped casing 57 itself is the diffusion box. Inside this box-shaped casing 57 are disposed reflecting mirrors 55 in the same manner as for the embodiment indicated in FIG. 11.

Figure 14:
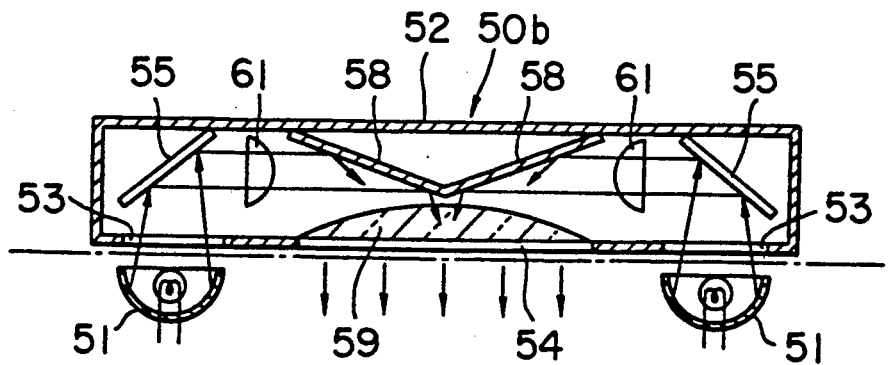

In the light convergence means 50b indicated in FIG. 14, are disposed second reflecting mirrors 58 between the reflecting mirrors 55 and the light irradiation outlet opening 54, and a converging lens 59 that converges the reflected light from this second reflecting mirror 58. In addition, there are also convex lenses 61 disposed between the reflecting mirrors 55 and the second reflecting mirrors 58.

According to the light convergence means 50b of this embodiment, it is possible to irradiate a more intense light in the direction of the second original platen 14.

Figure 13:
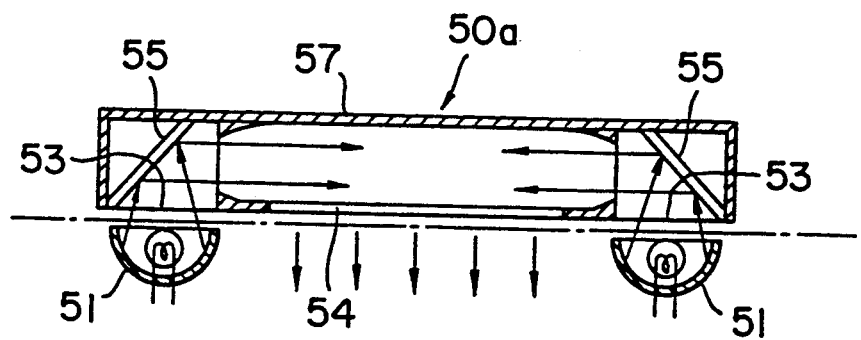
Figure 15:
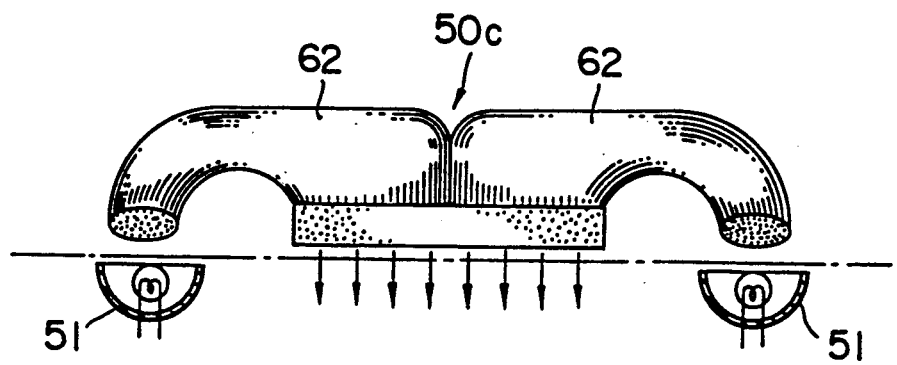

In the light convergence means 50c indicated in FIG. 15, optical fibers 62 are disposed so as to connect the light irradiation inlet openings 53 and the light irradiation outlet opening 54 (Refer to FIG. 13 and FIG. 14).

Figure 16:
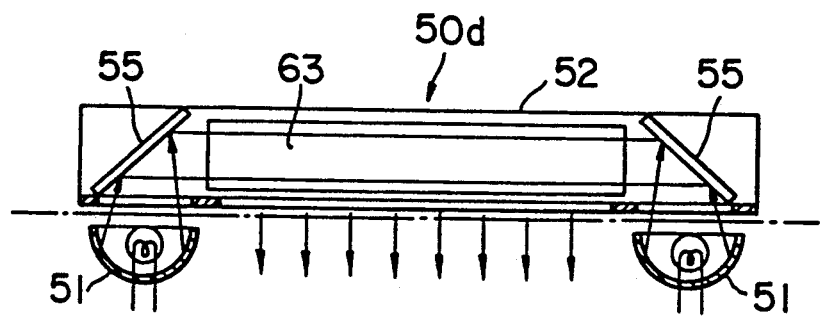

In the light convergence means 50d indicated in FIG. 16, a fluorescent optical collector 63 is disposed so as to generate fluorescence between a pair of reflecting mirrors 55 inside the box-shaped casing 52.

Figure 17:
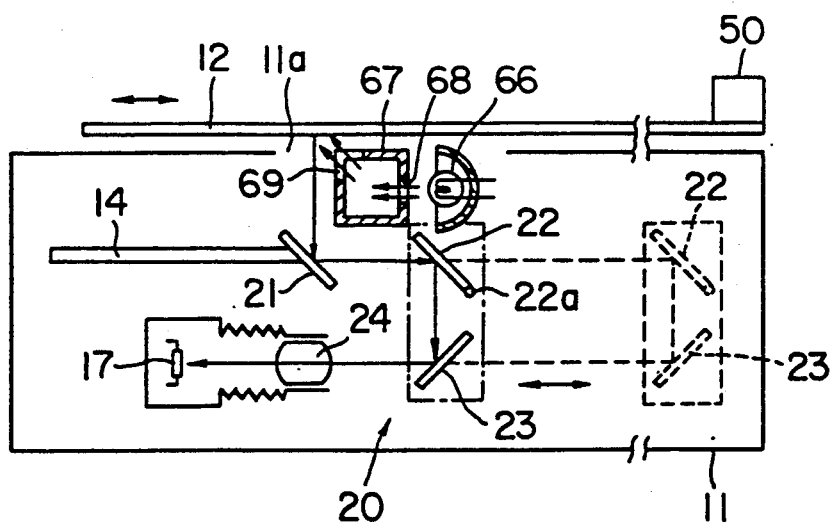
FIG. 17 through FIG. 19 are diagrams indicating a fourth embodiment of the apparatus according to the present invention, with FIG. 17 and FIG. 19 being outline longitudinal sectional drawings and FIG. 18 being an outline drawing for describing the position of the light source.
Figure 18:
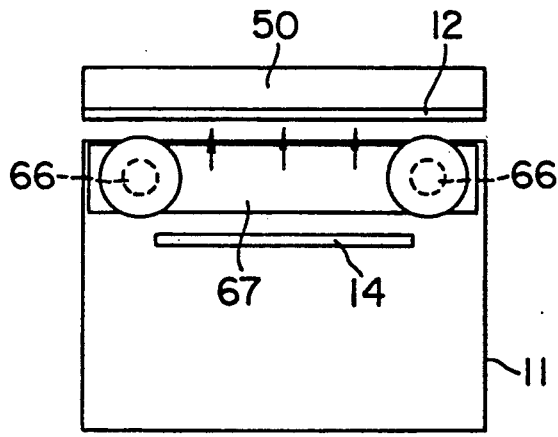
Figure 19:
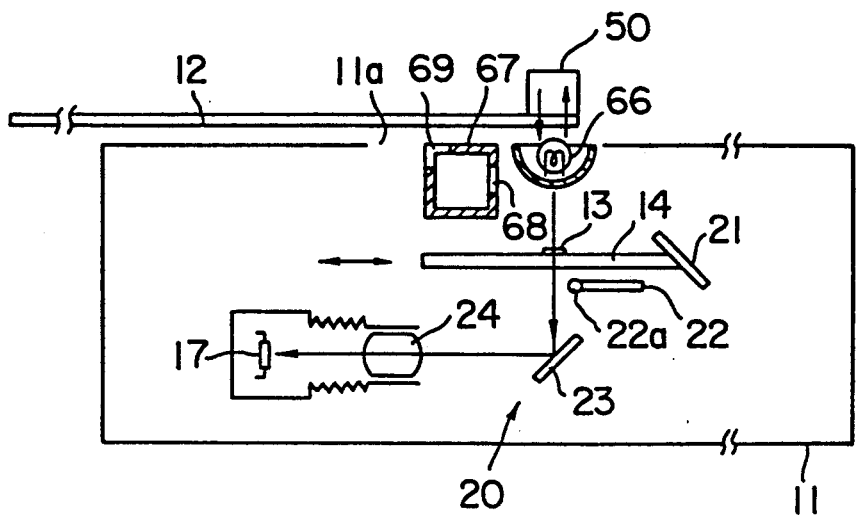

FIG. 17 through FIG. 19 indicate a fourth embodiment according to the present invention. The apparatus according to this embodiment is characterized in that the first light source and the second light source share the same light source. The remainder of the configuration is the same as the apparatus indicated for the first through third embodiments and so corresponding portions are indicated with the same numerals, and the corresponding description of them is omitted.

In this embodiment, a pair of light sources 66 are movable between an attitude facing horizontally and an attitude facing upwards. This is to say that the light source 66 is mounted by a swinging pins (not shown) so as to be rotatable 90° to positions in both of the top ends in the body casing 11 (Refer to FIG. 18).

A first convergence means 67 is disposed so the light from the light sources 66 converges between the light sources 66 and the slit 11a and so that the light passing through the slit 11a in the direction of the first original platen 12 is irradiated. In addition, to one end of the first original platen 12 is disposed a second light convergence means 50 having the same structure as the previously described embodiments so that the light from light sources is converged and is irradiated in the direction of the second original platen 14.

The first convergence means 67 has the sectional shape of a square box and is disposed so that the longitudinal direction thereof is horizontal and perpendicular to the direction of the movement of the first original platen 12. At both ends of the first convergence means 67 are provided light irradiation inlet openings 68 opposing the light source 66. In addition, at an upper portion of the first convergence means 67 are provided a light irradiation outlet slit 69 that irradiates light in the direction of the slit 11a. The first convergence means 67 has the same internal structure as the light convergence means indicated in FIG. 11 and in FIG. 13 through FIG. 16.

The light convergence means 50 has the same structure as the light convergence means 50 of the previously described third embodiment and hence the description for it is omitted.

In this embodiment, the light sources 66 is rotated so as to irradiate light in the horizontal direction as indicated in FIG. 17, when an original on the first original platen 12 is scanned. The light that is irradiated from the light sources 66 is converged ty the first convergence means 67, passes through the slit 11a and is irradiated to the first original platen 12.

When an original on the second original platen 14 is scanned, the light sources 66 are rotated so as to irradiate light in the upward direction, as indicated in FIG. 19. The light that is irradiated from the light sources 66 is converged by the light convergence means 50 and is irradiated to the second original platen 14 in the same manner as described earlier for the third embodiment.

According to the present embodiment, the first and the second light sources are the same so that it is possible to make the apparatus more compact.

Figure 20:
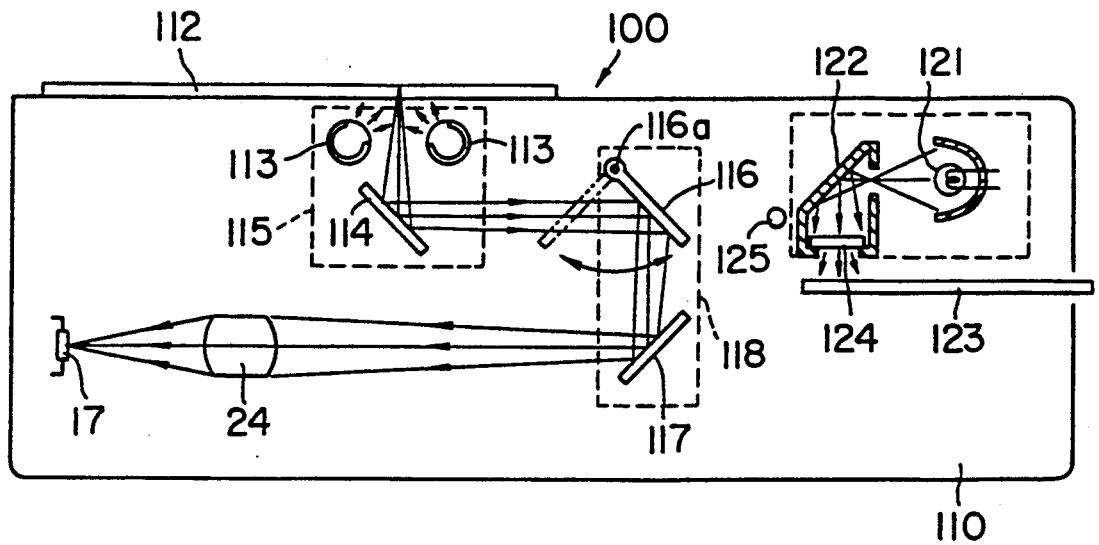
FIG. 20 through FIG. 23 are drawings indicating a fifth embodiment of the apparatus according to the present invention, with FIG. 20 and FIG. 21 being outline longitudinal sectional drawings, and FIG. 22 and FIG. 23 being longitudinal sectional drawings indicating the structure of a unit for holding the second and third reflecting mirrors.
Figure 21:
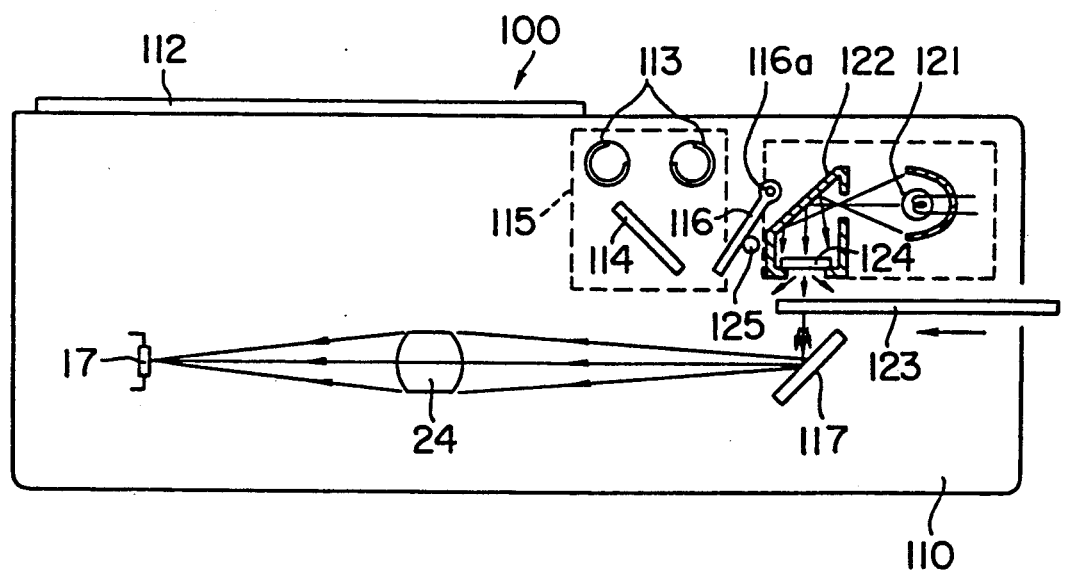

FIG. 20 and FIG. 21 indicate a fifth embodiment according to the present invention. In an image scanning apparatus 100 according to this embodiment, a first original platen 112 is formed on and is fixed to a top surface of a body casing 110. Inside this body casing 110 are disposed first light sources 113 that irradiate light to a first original platen 112, and disposed beneath this first light sources 113 is a first reflecting mirror 114 that receives the reflected light from an original placed on the first original plater 112. The first light sources 113 and the reflecting mirror 114 are both mounted to a first unit 115 which can move horizontally.

At a position opposing the reflecting mirror 114 is disposed a second reflecting mirror 116 that reflects the light from the reflecting mirror 114, in the downward direction. Then, at a position below and opposing the second reflecting mirror 116 is disposed a third reflecting mirror 117. Then, these second reflecting mirror 116 and third reflecting mirror 117 are both mounted to a second unit 118 and move together with this second unit 118.

The light from a third reflecting mirror 117 passes through a convergence lens 24 in the same manners as in the embodiments described above and is irradiated to an image sensor 17.

Inside the body casing 110 is disposed a second light source 121 so that the light is irradiated in the horizontal direction. At a position opposing the second light source 121 is disposed a fourth reflecting mirror 22 which reflects the light from the second light source 21, in the downward direction.

At a position beneath the fourth reflecting mirror 22 is disposed a second original platen 123 so as to be movable in the horizontal direction. In addtion, between the fourth reflecting mirror 122 and the second original platen 123 is disposed a diffusion plate 124 that diffuses the reflected light from the fourth reflecting mirror 122.

The second reflecting mirror 116 has an upper end portion linked to a swinging shaft 116a so that it can be swung around the pivot of the swinging shaft 116a. In the vicinity of the fourth reflecting mirror 122 is disposed a stopper 125 so that the second reflecting mirror 116 is swung when it contacts this stopper 125.

The following is a description of the operation for scanning an original placed on the first original platen 112 of an apparatus according to this embodiment. In this case, as indicated in FIG. 20, the second reflecting mirror 116 is swung to a position indicated by the solid line, and the reflecting mirror 114, second reflecting mirror 116 and third reflecting mirror 117 form a path reflecting light into the convergence lens 24. Then, while the light from the first light sources 113 is being irradiated in the direction of the first origianl platen 112, the first light sources 113 and the reflecting mirror 114 are horizontally moved together with the first unit 115 along the lower surface of the first original platen 112. At the same time, the second reflecting mirror 116 and the third reflecting mirror 117 are moved along with the second unit 118 in the same direction. In this case, the optical length between the original and the image sensor 17 is maintained constant and so if the speed of movement of the first unit 115 is V, then the speed of movement of the second unit 118 becomes V/2.

By this action, the reflected light from the original on the first original platen 112 is irradiated to the image sensor 17 and the scanning of the image is performed.

The following is a description of the operation for scanning an original on a second original platen 123. In this case, the second unit 118 is first moved towards the fourth reflecting mirror 122 till the third reflecting mirror 117 comes to the position directly beneath the fourth reflecting mirror 122. In this case, the second reflecting mirror 116 contacts the stopper 125 ard is swung to the left, as indicated in FIG. 21.

In this status, light is irradiated from the second light source 121 and is irradiated to the second original platen 123 via the fourth reflecting mirror 122 and the diffusion plate 124. Light is transmitted through the original on the second original platen 123 when the second original platen 123 is moved horizontally so as to cross the optical path formed by the fourth reflecting mirror 122 and the third reflecting mirror 117. This transmitted light passes through the convergence lens 24 and is irradiated to the image sensor 17 and the image scanning of the image on the original on the second original platen 123 is performed.

Figure 22:
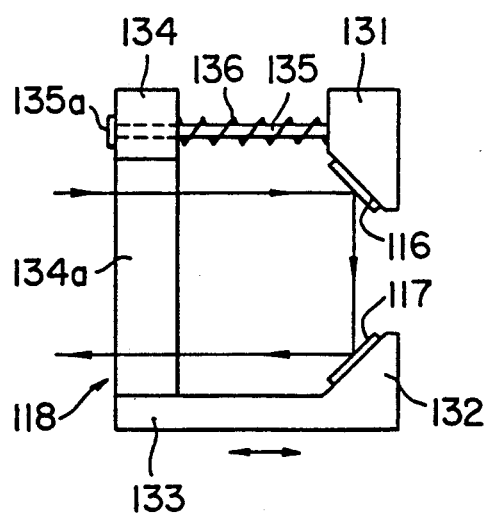
Figure 23:
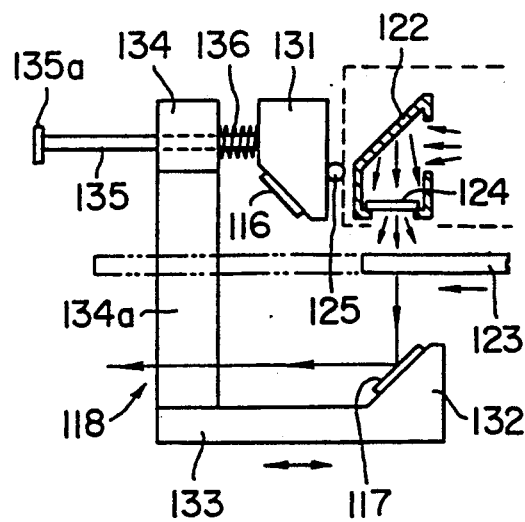

FIG. 22 and FIG. 23 are views indicating the configuration where the positions of the second reflecting mirror 116 and the fourth reflecting mirror 122 opposing the third reflecting mirror 117 are switched. The second reflecting mirror 116 is fixed to an inclined surface below the block 131 which is above it. In addition, the third reflecting mirror 117 is fixed to an inclined surface above a block 132 which is below it. The block 132 is fixed to one end of a base 133 and to the other end of the base 133 is fixed an upright column 134. To the upper end of the column 134 is a sliding bar 135 which is supported so as be slidably movable. To one end of this sliding bar 135 is fixed a block 131 and to the other end is fixed a stopper 135a. To the sliding bar 135 between the column 134 and the block 131 is fitted a coil spring 136 and to the central portion of the column 134 is formed a space 134 through which the second original platen 123 can pass through. Then, the column 134, base 133, block 131, block 132 and the sliding bar 135 configure the second unit 118.

FIG. 22 corresponds to FIG. 20, and indicates the status where image scanning is performed for an original placed on the first original platen 112 of this embodiment. This is to say that the block 131 is moved forward along with the sliding bar 135 by the action of the spring 136 and the second reflecting mirror 116 is at a position opposing the third reflecting mirror 117 and an optical path is formed by the second reflecting mirror 116 and the third reflecting mirror 117. In this status, the second unit 118 moves and the image is scanned.

FIG. 23 corresponds to FIG. 21, and indicates the status where image scanning is performed for an original placed on the second original platen 123 of this embodiment. This is to say that when the second unit 118 moves in the direction of the fourth reflecting mirror 122, the block 131 comes into contact with the stopper 125. The second unit 118 moves forward(to the right) along with the block 132 but the block 131 is held at the position where it is in contact with the stopper 125 because the sliding bar 135 slides the column 134. In this manner, the third reflecting mirror 117 is moved to a position directly below the fourth reflecting mirror 122 and the fourth reflecting mirror 122 and the third reflecting mirror 117 form an opticl path. In this status, image scanning of an original on the second original platen 123 is performed as described earlier, when the second original platen 123 moves horizontally.

Figure 24:
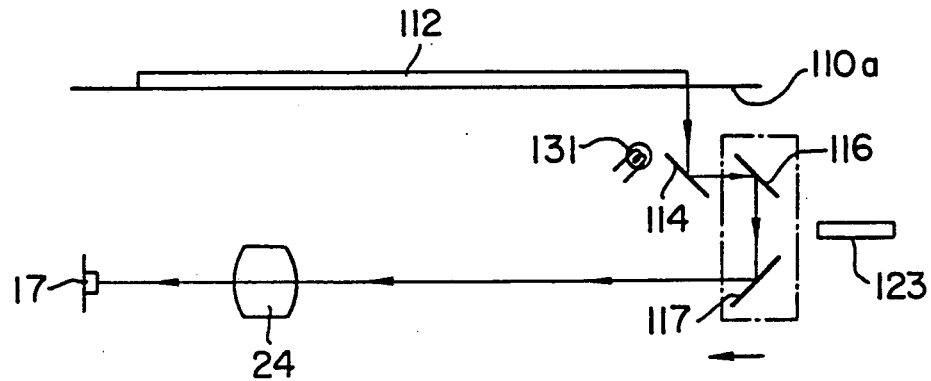
FIG. 24 and FIG. 25 are outline structural drawings indicating a sixth embodiment of the apparatus acccording to the present invention.
Figure 25:
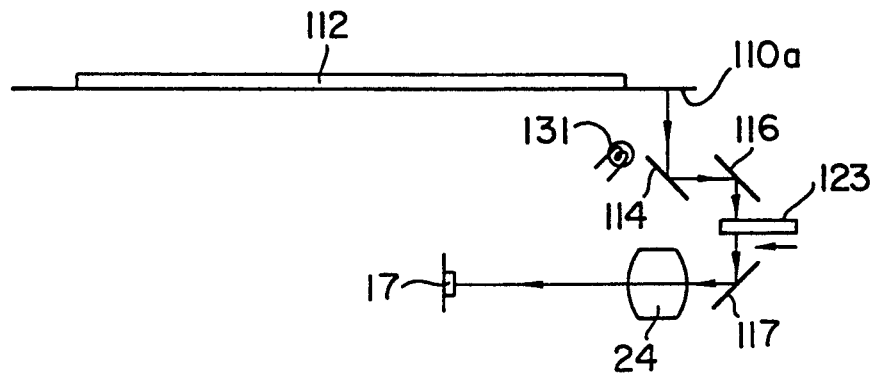

FIG. 24 and FIG. 25 indicate a sixth embodiment of the present invention.

The apparatus according to this embodiment is charracterized in that the first light source and the second light source are the same. The remainder of the configuration is the same as the apparatus indicated for the fifth embodiment and so corresponding portions are indicated with the same numerals, and the corresponding description of them is omitted.

In this embodiment, a light source 131 is disposed in the vicinity of a first reflecting mirror 114 and is movable together with the reflecting mirror 114. On an underside of a top surface of a main unit body casing 110 at a position above the second original platen 123 is mounted a reflecting member 110a that diffusively reflects light.

In the apparatus according to the present embodiment, when image scanning is performed for an original placed on a first original platen 112, then in the status indicated in FIG. 24, the same operation as described earlier for the fifth embodiment is performed.

When an original placed on the second original platen 123 is scanned, it is scanned when the optical system is disposed as indicated in FIG. 25. The light from a light source 131 is first irradiated to the reflecting member 110a and the reflected light from the reflecting member 110a is irradiated onto the second original platen 123 via the reflected light mirror 114 and second reflecting mirror 116.

In this manner, according to the present embodiment, the optical system is shared and so it is possible to make the apparatus more compact when compared to the fifth embodiment.

What is claimed is:

1. An apparatus for scanning an image, comprising:
a main unit body asing provided on its top surface with a slit through when light passes;
a first original platen disposed so as to be movable in a horizontal direction perpendicular to said slit to the top of the main unit body casing and having a transparent surface on which an original is placed;
a second original platen disposed so as to be movable in the horizontal direction inside the main unit body casing upon which platen an original is placed;
a first light source disposed inside the main unit body casing and irradiating light onto the original on the first platen via the slit,
a second lights ource irradiating light in the downward direction onto the original on the second platen,
an image sensor disposed inside the main unit body casing; and
optical means disposed inside the body casing, for passing reflected light from the original placed on the first original platen and light transmitted through the original placed on the second original platen to said image sensor, respectively.

2. An apparatus for scanning an image, comprising:
a main unit body asing provided on its top surface with a slit through when light passes;
a first original platen disposed so as to be movable in a horizontal direction perpendicular to said slit to the top of the main unit body casing and having a transparent surface on which an original is placed;
a second original platen disposed so as to be movable in the horizontal direction inside the main unit body casing upon which platen an original is placed;
a first light source disposed inside the main unit body casing and irradiating light onto the original on the first platen via the slit,
a second lights ource irradiating light in the downward direction onto the original on the second platen,
an image sensor disposed inside the main unit body casing; and
optical means disposed inside the body casing, for passing reflected light from the original placed on the first original platen and light transmitted through the original placed on the second original platen to said image sensor, respectively; wherein said optical means comprises:
a first reflecting mirror that reflects light reflected by the original placed upon the first original platen, into a first optical path parallel to said horizontal direction;
a second reflecting mirror disposed so as to be movable with respect to the first reflecting mirror, to a position removed from the first optical path and a position on said first optical path, and which reflects light reflected from said first reflecting mirror, in a direction perpendicular to said first optical path;
a third reflecting mirror disposed so as to oppose the second reflecting mirror, and which reflects light reflected by said second reflecting mirror, into the second optical path extending in a direction opposite to and parallel to said first optical path;
a converging lens disposed along said second optical path between the third reflecting mirror and the image sensor; and removing means for removing said second reflecting mirror from the first optical path.

3. The apparatus according to claim 2, wherein; said first reflecting mirror is mounted to one end of said second original platen.

4. The apparatus according to claim 2, wherein; said second and third reflecting mirrors can both move together in the horizontal direction.

5. The apparatus according to claim 2, wherein; said removing means comprises a swinging shaft supporting the second reflecting mirror so that it is swingable, a lever mounted perpendicularly to said swinging shaft, and a contact member mounted to one end of said second original platen, and pressing against said lever.

6. The apparatus according to claim 1, wherein; said second light source is disposed within the body casing.

7. An apparatus for scanning an image, comprising:
a main unit body asing provided on its top surface with a slit through when light passes;
a first original platen disposed so as to be movable in a horizontal direction perpendicular to said slit to the top of the main unit body casing and having a transparent surface on which an original is placed;
a second original platen disposed so as to be movable in the horizontal direction inside the main unit body casing upon which platen an original is placed;
a first light source disposed inside the main unit body casing and irradiating light onto the original on the first platen via the slit,
a second lights ource irradiating light in the downward direction onto the original on the second platne,
an image sensor disposed inside the main unit body casing; and
optical means disposed inside the body casing, for passing reflected light from the original placed on the first original platen and light transmitted through the original placed on the second original platen to said image sensor, respectively;
said second light source is mounted on the first original platen disposed outside of a body casing.

8. The apparatus according to claim 1, wherein; said second light source is disposed in an upward direction so as to irradiate light upwards through the slit in the body casing, on said first original platen being mounted converging means to converge light irradiated from said second light source and irradiate it towards said second original platen.

9. An apparatus for scanning an image, comprising:
a main unit body asing provided on its top surface with a slit through when light passes;
a first original platen disposed so as to be movable in a horizontal direction perpendicular to said slit to the top of the main unit body casing and having a transparent surface on which an original is placed;
a second original platen disposed so as to be movable in the horizontal direction inside the main unit body casing upon which platen an original is placed;
a first light source disposed inside the main unit body casing and irradiating light onto the original on the first platen via the slit,
a second lights ource irradiating light in the downward direction onto the original on the second platne,
an image sensor disposed inside the main unit body casing; and
optical means disposed inside the body casing, for passing reflected light from the original placed on the first original platen and light transmitted through the original placed on the second original platen to said image sensor, respectively; wherein,
said second light source is disposed in an upward direction so as to irradiate light upwards through the slit in the body casing, on said first original platen being mounted converging means to converge light irradiated from said second light source and irradiate it towards said second original platen; wherein,
said converging means comprises a box-shaped casing in which are formed a light irradiation inlet opening towards the second light source, a light irradiation outlet opening that irradiates light towards the second original platen, and
a light reflecting means disposed inside the casing and that reflects light irradiated from the light irradiation inlet opening, in the upwards direction of said light irradiation outlet opening.

10. The apparatus according to claim 9, wherein:
inside said box-shaped casing are disposed the second light reflecting means between said light reflecting means and the light irradiation outlet opening, and a converging means to converge reflected light from said second light reflecting means.

11. The apparatus according to claim 9, wherein; inside said box-shaped casing is disposed a fluorescence generation means between said light reflecting means and the light irradiation outlet opening.

12. An apparatus for scanning an image, comprising:
a main unit body asing provided on its top surface with a slit through when light passes;
a first original platen disposed so as to be movable in a horizontal direction perpendicular to said slit to the top of the main unit body casing and having a transparent surface on which an original is placed;
a second original platen disposed so as to be movable in the horizontal direction inside the main unit body casing upon which platen an original is placed;
a first light source disposed inside the main unit body casing and irradiating light onto the original on the first platen via the slit,
a second lights ource irradiating light in the downward direction onto the original on the second platen,
an image sensor disposed inside the main unit body casing; and
optical means disposed inside the body casing, for passing reflected light from the original placed on the first original platen and light transmitted through the original placed on the second original platen to said image sensor, respectively; wherein,
said second light source is disposed in an upward direction so as to irradiate light upwards through the slit in the body casing, on said first original platen being mounted converging means to converge light irradiated from said second light source and irradiate it towards said second original platen; wherein,
inside said box-shaped casing is disposed optical fiber means between said light reflecting means and the light irradiation outlet opening.

13. An apparatus for scanning an image comprising:

a main unit body asing provided on its top surface with a slit through when light passes;

a first original platen disposed movably in a horizontal direction perpendicular to said slit to the top of the main unit body casing and having a transparent surface on which an original is placed;

a second original platen disposed movably in said horizontal direction inside the main unit body casing upon which platen an original is placed;

a first light source disposed inside the main unit body casing and irradiating light onto the original on the first platen via the slit, first converging means disposed inside the body casing, converging light from the light source and irradiating it through said slit towards the first original platen;

second converging means disposed on said first original platen, converging light from said light source and irradiating it towards said second original platen;

an image sensor disposed inside the main unit body casing; and optical means disposed inside the body casing, for passing reflected light from the original placed on the first original platen and light transmitted through the original placed on the second original platen to said image sensor, respectively.

14. An apparatus for scanning an image comprising:

a main unit body casing provided on its top surface with transparent surface through which light can pass, a first original platen formed on said transparent surface of a main unit body casing, and upon which an original is placed;

a second original platen disposed so as to be movable in the horizontal direction inside the main unit body casing upon which platen an original is placed;

a first light source disposed inside the main unit body casing and so as to irradiate light through said transparent surface, onto the original placed on the first original platen;

a second light source that irradiates light downwards towards the original placed on the second original platen;

an image sensor disposed inside the main unit body casing;

first optical means disposed inside the main unit body casing, for passing irradiating light reflected from the original placed on the first original platen, to said image sensor;

second optical means disposed inside the main unit body casing, for irradiating light transmitted through the original placed on the second original platen, to said image sensor; and optical path blocking means for blocking an optical path inside said first optical means.

* * * * *